(12) United States Patent
McLaughlin

(10) Patent No.: US 6,267,526 B1
(45) Date of Patent: Jul. 31, 2001

(54) HEADED SOLID ROD FOR TORQUE ROD SPACER

(75) Inventor: Ronald J. McLaughlin, Maumee, OH (US)

(73) Assignee: The Pullman Company, Milan, OH (US)

( * ) Notice: Subject to any disclaimer, the term of this patent is extended or adjusted under 35 U.S.C. 154(b) by 0 days.

(21) Appl. No.: 09/340,370

(22) Filed: Jun. 28, 1999

(51) Int. Cl.$^7$ .................................................. P60K 17/00
(52) U.S. Cl. ..................... 403/150; 180/352; 280/86.75; 280/124.11
(58) Field of Search .................................... 180/352, 378, 180/349; 280/86.75, 86.757, 124.11, 124.116; 403/150, 152, 157, 158, 289, 290

(56) References Cited

U.S. PATENT DOCUMENTS

| | | | |
|---|---|---|---|
| 2,115,915 | * | 5/1938 | McCain .......................... 280/86.757 |
| 2,319,430 | | 5/1943 | Olley et al. . |
| 2,323,007 | | 6/1943 | Borgward . |
| 3,392,971 | | 7/1968 | Herbenar et al. . |
| 3,497,233 | * | 2/1970 | Bolaski, Jr. ..................... 280/86.757 |
| 5,230,528 | * | 7/1993 | Van Raden et al. ...... 280/124.116 X |
| 5,458,359 | * | 10/1995 | Brandt .............................. 180/349 X |
| 5,564,521 | * | 10/1996 | McLaughlin et al. ............... 180/352 |
| 5,588,209 | | 12/1996 | Fisher et al. . |
| 5,662,349 | | 9/1997 | Hasshi et al. . |
| 5,673,929 | | 10/1997 | Alatalo . |
| 5,711,544 | * | 1/1998 | Buhl .............................. 280/124.116 |

* cited by examiner

Primary Examiner—Lynne H. Browne
Assistant Examiner—John R. Cottingham
(74) Attorney, Agent, or Firm—Harness, Dickey & Pierce, PLC

(57) ABSTRACT

In one embodiment, a V-configuration torque rod has an apex joint assembly and a pair of end pivotal joint assemblies. The apex joint assembly is attached to each end pivotal joint assembly using a rod. The rod includes a headed end which increases the radial distance at which the rod is welded to the joint assembly. The attachment of the rod to the apex joint assembly can be by welding or by using a clamp. The rod can either be a solid rod or it can be a tubular rod. In another embodiment, the torque rod is a straight torque rod which includes a rod connecting two end pivotal joint assemblies. Both ends of the rod include a headed end which increases the radial distance at which the rod is welded to the joint assembly. The rod can either be a solid rod or it can be a tubular rod.

21 Claims, 5 Drawing Sheets

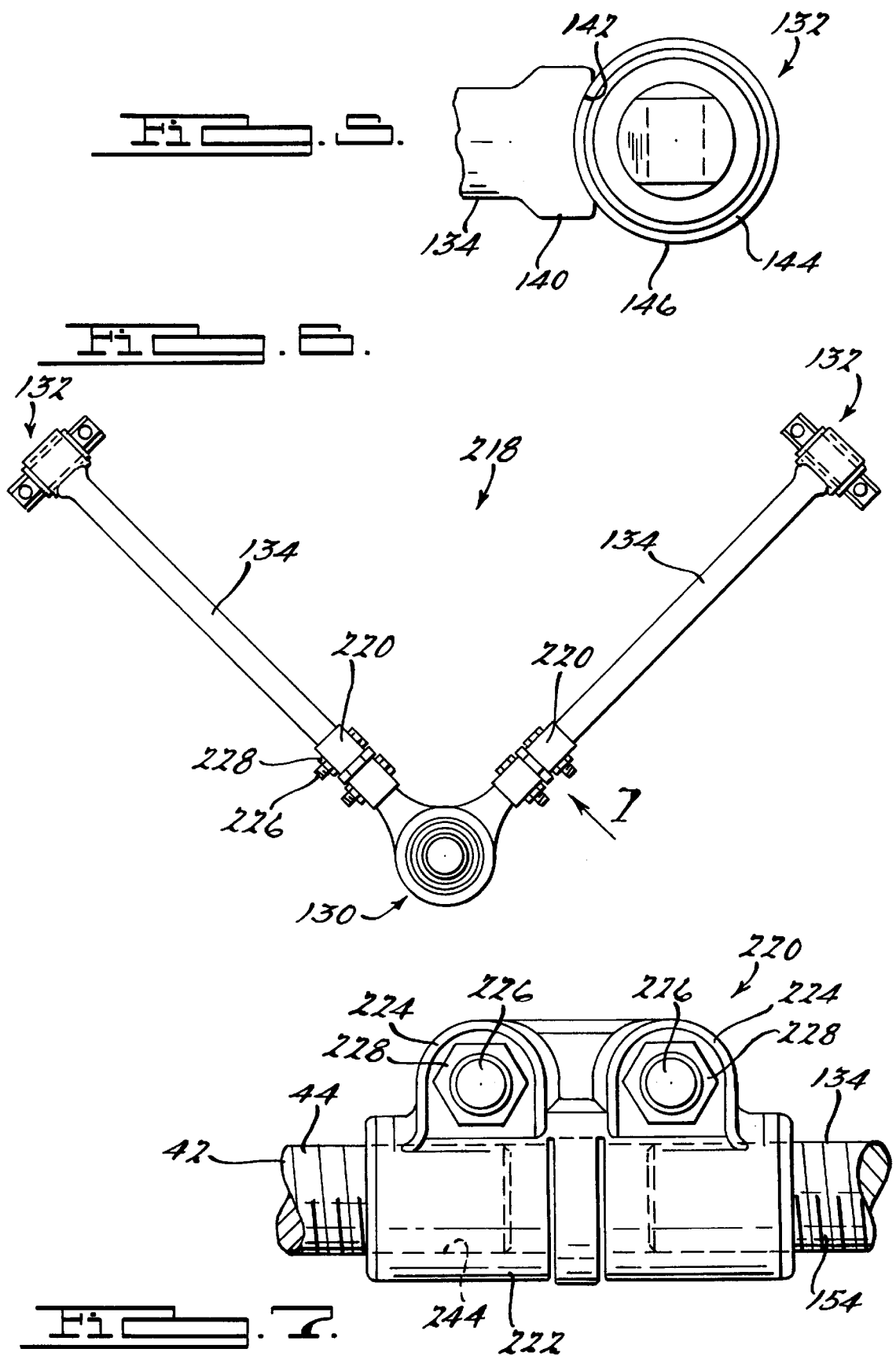

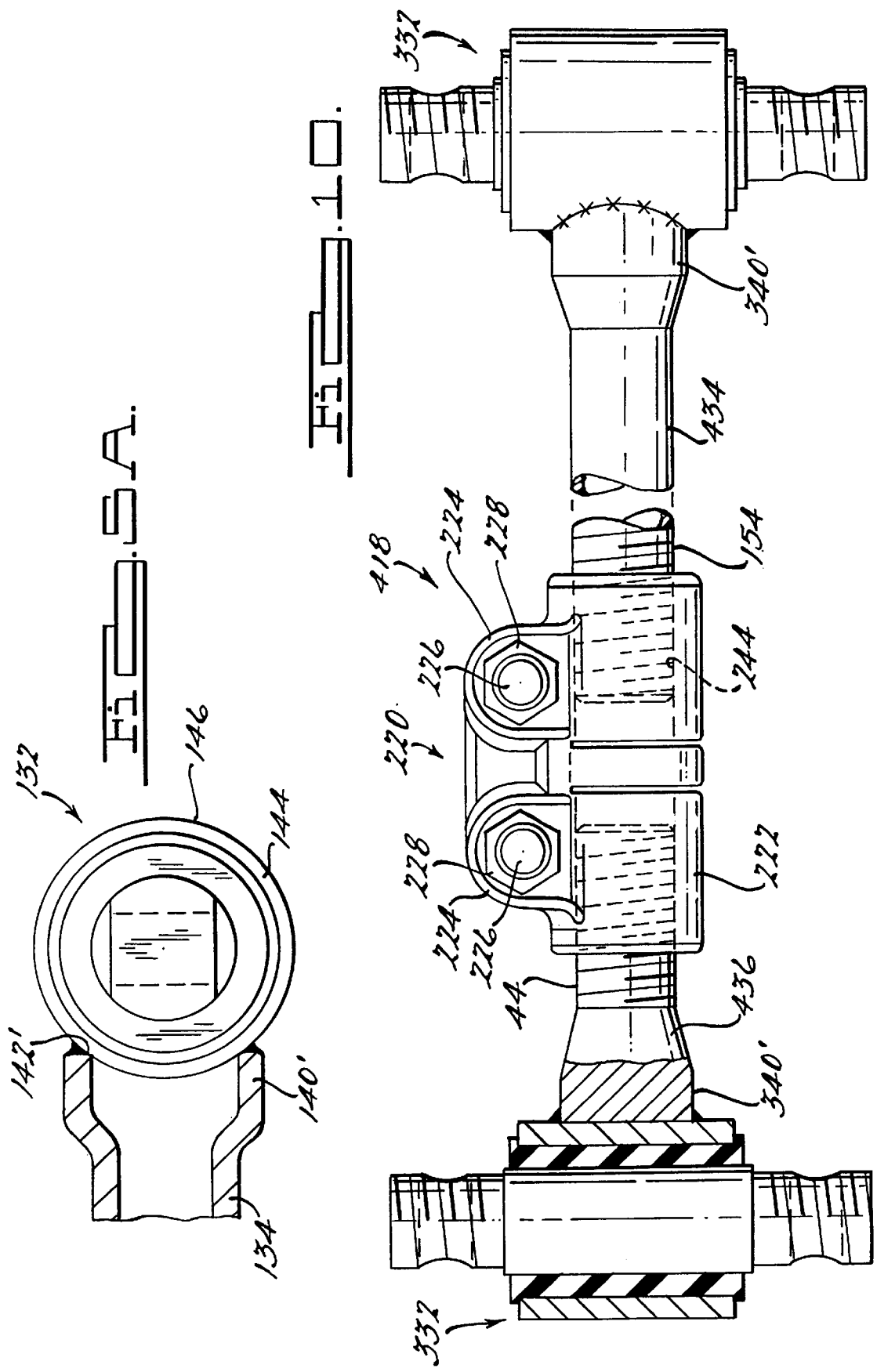

HEADED SOLID ROD FOR TORQUE ROD SPACER

FIELD OF THE INVENTION

The present invention is related to torque rod assemblies for use in suspension systems for trucks, buses and the like. More particularly, the present invention is related to an improved spacer created from a headed solid rod for the torque rod assemblies.

BACKGROUND OF THE INVENTION

Truck and bus suspensions utilize at least one torque rod to secure the drive axle to the vehicle's frame. The securing of the drive axle to the vehicle's frame by the torque rod maintains the drive axle's alignment to the vehicle's frame, it maintains the proper suspension geometry for the vehicle, and it allows free suspension movements in jounce and rebound for all terrain, road and driving conditions. Because of the wide range of dynamic operating conditions for these vehicles, especially heavy duty trucks, the severe impact loads to the suspension system combined with the road induced vibrations on the suspension system lead to a deleterious effect on the individual suspension components including the torque rods as well as having a negative impact on the operator's physical fatigue condition. These severe dynamic conditions can accelerate wear of the torque rods of the suspension system leading to premature failures of these torque rods.

The purpose of torque rods on large vehicles is to stabilize the axle. They prevent the axle from rotating about its axis; they prevent the axle for moving fore and aft during braking and acceleration; and they prevent axle yaw. While there are a variety of suspension designs, one of two approaches are generally used to stabilize the axle. The first approach uses straight rods with pivotal joints at either end. Two of these straight rods are mounted fore and aft on the vehicle; where one end is mounted to the axle and the other end is mounted to the frame. A third straight rod is similarly mounted laterally in the vehicle, generally perpendicular to the other two. The second approach is a V-configuration torque rod assembly. This type of torque rod has pivotal joints at the apex of the V as well as at the ends of the legs. The apex is mounted to the axle, and the legs are mounted to the frame. The V-configuration controls both fore-aft movement as well as lateral movement. The major advantage of the V-configuration rod assembly is axle stability.

A typical prior art single or V-configuration torque rod is comprised of two or three pivotal joint eyelet forgings rigidly connected with tubes to provide the mechanical integrity. The eyelets and tubes form a natural path for shock and vibration energy to transfer from the suspension system into the frame, the cab and other areas of the sprung mass of the vehicle. In order to intercept this path, attempts have been made to incorporate an isolation function into the pivotal joint design. This isolation function thus makes the pivotal joint a critical multi-functional component for the torque rod assembly as well as the suspension system as a whole.

These prior art torque rods have been designed as MIG welded tube to tube designs, resistance and MIG welded tube to tube designs, cast designs, polymer designs as well as other types of construction. Designs which incorporate solid rods, which are cheaper, were not able to be developed due to the fact that the diameter of the solid rod was too small to be connected to the pivot joints and still maintain an acceptable eye flexure and fatigue life. The tube designs, being larger in diameter, offered a larger radius at the point of welding to the pivot joints thus significantly improving the flexure and fatigue strength of the assembly.

The continued development of torque rod assemblies has been directed towards lower cost designs which offer equivalent or better performance characteristics.

SUMMARY OF THE INVENTION

The present invention provides the art with headed solid rod torque rod assembly that provides an improved performance along with a high load carrying capability. The torque rod assembly of the present invention is more economical due to the use of the lower cost solid rod connecting sections.

Other advantages and objects of the present invention will become apparent to those skilled in the art from the subsequent detailed description, appended claims and drawings.

BRIEF DESCRIPTION OF THE DRAWINGS

In the drawings which illustrate the best mode presently contemplated for carrying out the present invention:

FIG. 5 is an enlarged side view of the connection between the spacer bar and the end pivotal joint shown in FIG. 4;

FIG. 5A is an enlarged side view of the connection between a spacer bar and the end pivotal joint in accordance with another embodiment of the present invention;

FIG. 6 is a plan view similar to FIG. 5 but in accordance with another embodiment of the present invention;

FIG. 7 is an enlarged view of the connections between the solid bar and the apex pivotal joint of the torque rod shown in FIG. 6;

FIG. 10 is a plan view similar to FIG. 8 but in accordance with another embodiment of the present invention.

DETAILED DESCRIPTION OF THE PREFERRED EMBODIMENT

Figure 1:
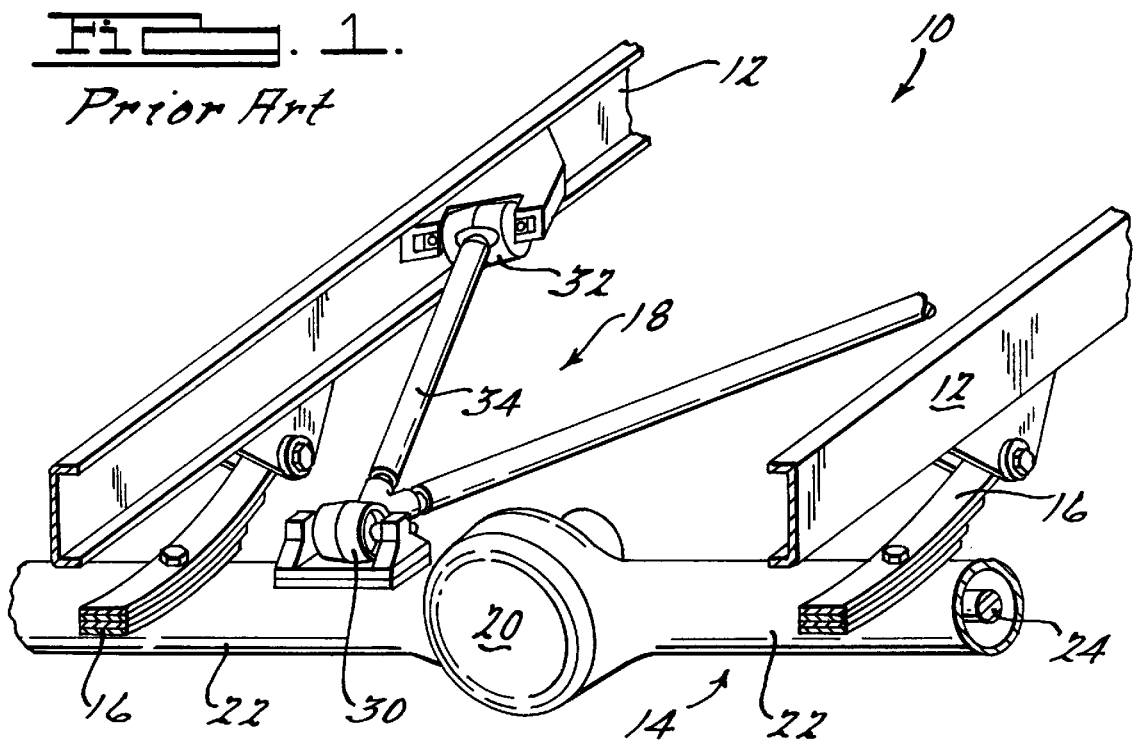
FIG. 1 is a partial perspective view of a typical truck or bus rear suspension having a prior art V-configuration torque rod.

Referring now to the drawings in which like reference numerals designate like or corresponding parts throughout the several views, there is shown in FIG. 1 a prior art truck or bus rear suspension indicated generally by the reference numeral 10. Rear suspension 10 comprises a frame 12, a drive axle 14, a pair of springs 16 and a V-configuration torque rod 18. Frame 12 supports a body (not shown) and other components of the vehicle which are termed the sprung mass. Drive axle 14 includes a differential 20 which receives torque from an engine (not shown) through a prop shaft (not shown). Drive axle 14 also includes a pair of hollow tubes 22 that each extend out to a respective wheel assembly (not shown). Disposed within each tube 22 is a drive shaft 24 that extends to a hub (not shown) to which is attached to a wheel (not shown). The engine transmits torque to differential 20 though the prop shaft. Differential 20 transfers the torque from the prop shaft to drive shafts 24 to rotate and thus drive the wheels. Springs 16 are disposed between frame 12 and drive axle 14 as is well known in the art. Additionally, a shock absorber (not shown) can be disposed between frame 12 and drive axle 14 to damper the motion between these two components. Torque rod 18 is also disposed between frame 12 and drive axle 14 to control the motion of drive axle 14 with respect to frame 12.

Figure 2:
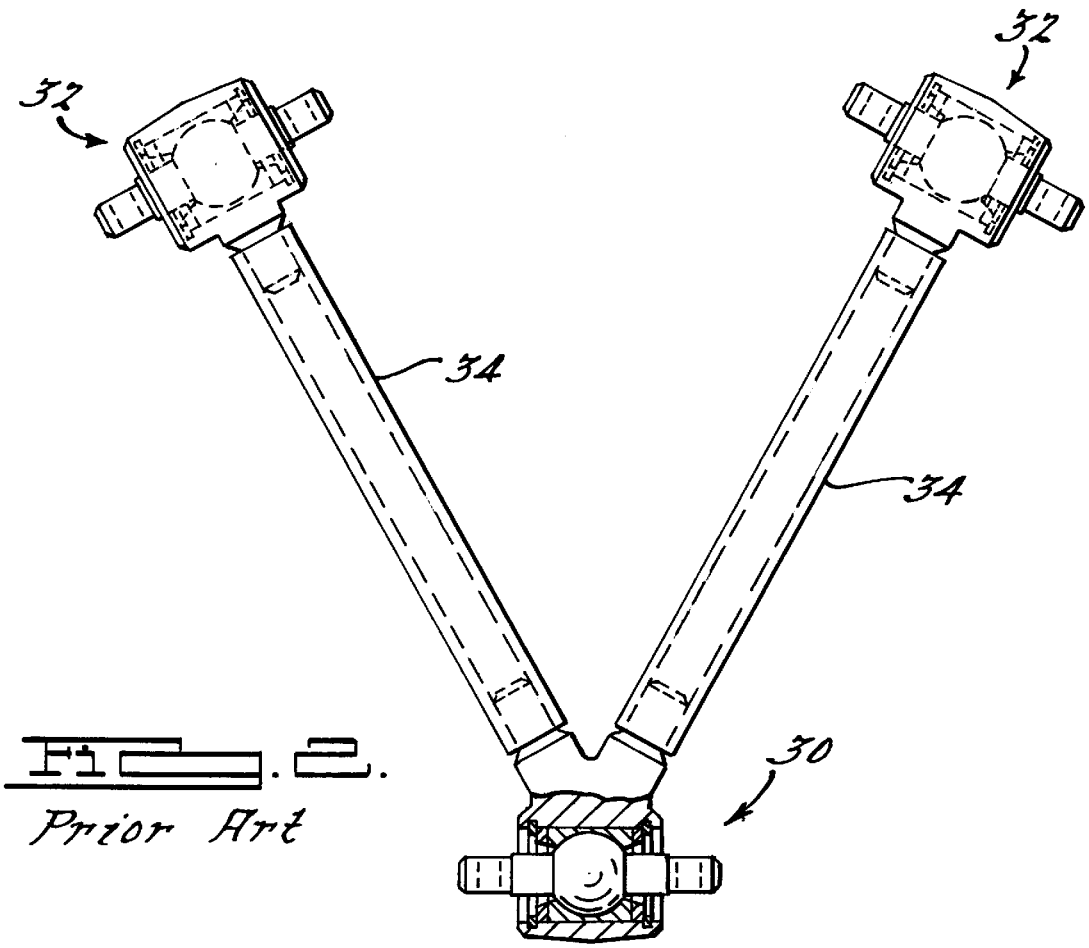
FIG. 2 is a plan view, partially in cross-section, illustrating the prior art V-configuration torque rod shown in FIG. 1.

Referring now to FIG. 2, V-configuration torque rod 18 comprises an apex pivotal joint assembly 30, a pair of end pivotal joint assemblies 32 and a pair of tubes 34. Each tube 34 extends between apex pivotal joint assembly 30 and a respective end pivotal joint assembly 32. Apex pivotal joint assembly 30 and end pivotal joint assemblies 32 are secured to tubes 34 by welding or by other means known well in the art.

Figure 3:
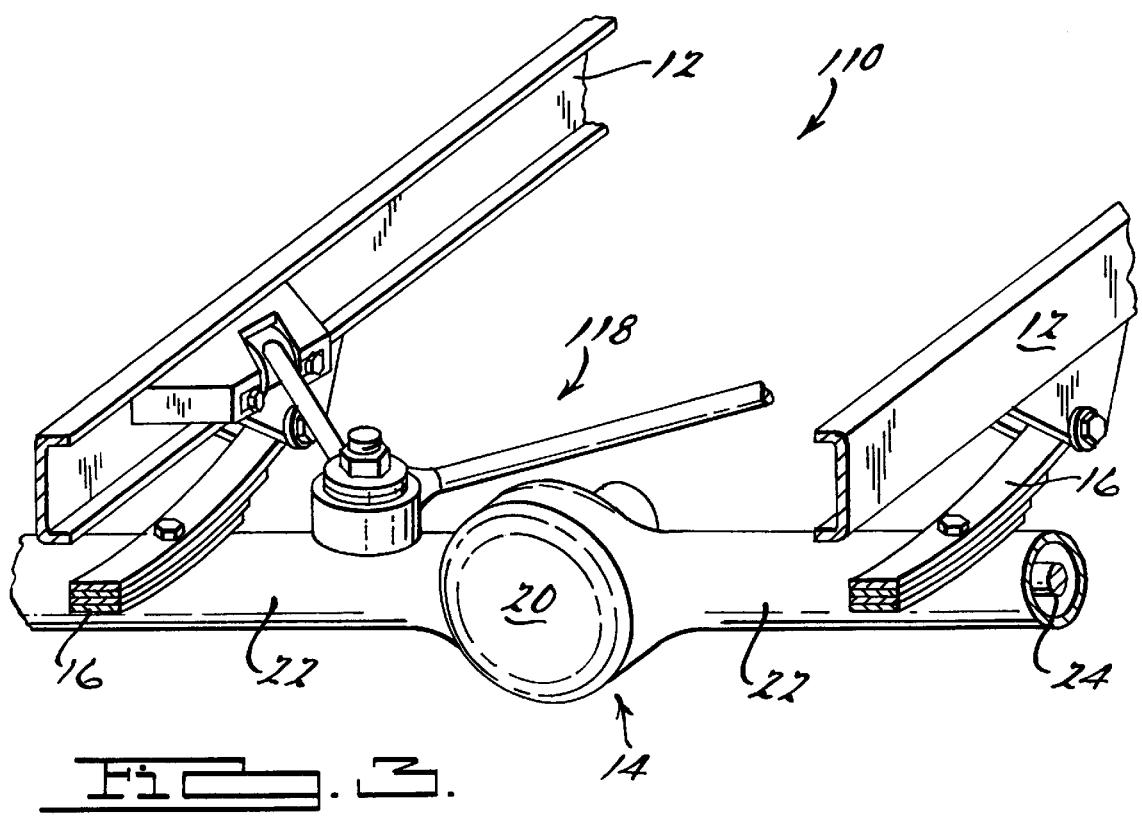
FIG. 3 is a partial perspective view of a typical truck or bus rear suspension having a V-configuration torque rod incorporating the solid bar connecting rod in accordance with the present invention.

Referring now to FIG. 3, a truck or bus rear suspension is illustrated incorporating the unique pivotal joint constructing in accordance with the present invention and it is designated generally by the reference numeral 110. Rear suspension 110 comprises frame 12, drive axle 14, the pair of springs 16 and a V-configuration torque rod 118. Rear suspension 110 is thus the same as rear suspension 10 but it replaces torque rod 18 with torque rod 118.

Figure 4:
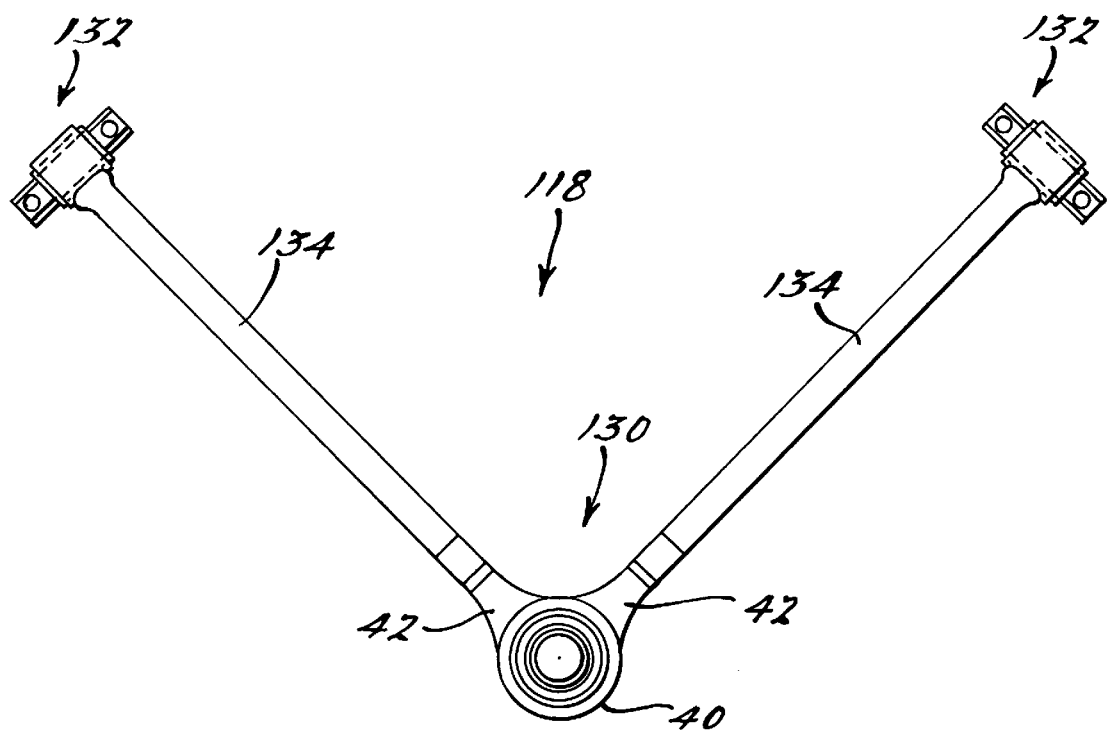
FIG. 4 is a plan view, partially in cross-section illustrating a unique V-configuration torque rod in accordance with the present invention.

Referring now to FIG. 4, V-configuration torque rod 118 comprises an apex pivotal joint assembly 130, a pair of end pivotal joint assemblies 132 and a pair of solid bars 134. Each solid bar 134 extends between apex pivotal joint assembly 130 and a respective end pivotal joint assembly 132. Apex pivotal joint assembly 130 and end pivotal joint assemblies 132 are secured to solid bars 134 by welding or by other means known in the art.

As shown in FIG. 4, apex pivotal joint assembly 30 is assembled into a V-shaped housing 40 which includes a pair of angular solid rod extensions 42 which are angled at an angle which is specific to each vehicle application. One end of each solid rod 134 is attached to a respective solid rod extension 42 by welding. Solid rod 134 can be welded to extension 42 by MIG welding, resistance welding, or the like. Because rod 134 is a solid rod rather than the prior art tubular rod 34, a more effective weld can be created between the two components. An additional method for attaching solid rod 134 to extension 42 is to utilize a combination of MIG and resistance welding. This combination enhances the overall strength of the weldment. Also, it is possible to head and resistance weld the two components in a single operation. This option provides both cost and strength benefits.

Referring now to FIG. 5, an enlarged view of the connection between solid rod 134 and its respective end pivotal joint assembly 132 is illustrated. Sold rod 134 defines an enlarged section 140 defining a generally cylindrical surface 142. Preferably, enlarged section 140 is manufactured by heading the end of solid rod 134 as is well known in the art. A generally tubular eyelet 144 defines an outer surface 146 which mates with cylindrical surface 142. Eyelet 144 is secured to enlarged section 140 by MIG welding or by other methods known well in the art. The heading operation that is performed on solid rod 134 increases the radial dimension of the welding area thus allowing the welding to be performed at a radial dimension that has proven to avoid early fatigue failures of the connection. Once eyelet 144 has been secured to solid rod 134, the assembly of end pivot joint assembly 132 into eyelet 144 can be accomplished.

While FIGS. 4 and 5 illustrate V-configuration torque rod 118 as having the pair of solid bars 134 having an enlarged section 140, it is within the scope of the present invention to have a V-configuration torque rod which incorporates a pair of tubular rods having an enlarged section to increase its radial dimension. Referring now to FIG. 5A, an enlarged view of the connection between a tubular rod 134' and its respective end pivotal joint assembly 132 is illustrated. Tubular rod 134' defines an enlarged section 140' defining a generally cylindrical surface 142'. Preferably enlarged section 140' is manufactured by heading the end of tubular rod 134' as is well known in the art. The generally tubular eyelet 144 defines outer surface 146 which mates with cylindrical surface 142'. Eyelet 144 is secure to enlarged section 140' by MIG welding or by other means known well in the art. The heading operation that is performed on tubular rod 134' increases the radial dimension of the welding area thus allowing the welding to be performed at a radial dimension that has proven to avoid early fatigue failures of the connection. Once eyelet 144 has been secured to tubular rod 134', the assembly of end pivot joint assembly 132 into eyelet 144 can be accomplished.

Referring now to FIGS. 6 and 7, a V-shaped torque rod 218 in accordance with another embodiment of the present invention is illustrated. V-configuration torque rod 218 comprises apex pivotal joint assembly 130, the pair of end pivotal joint assemblies 132, the pair of solid rods 134 and a pair of attachment clamps 220. V-shaped torque rod 218 is essentially the same as V-shaped torque rod 118 with the exception that the welding connection between solid rod 134 and extension 42 of apex pivotal joint assembly 130 is replaced with clamp 220.

Clamp 220 comprises a tubular housing 222 having a pair of radially extending ears 224. Extension 42 of housing 40 defines a threaded end 44. The end of solid rod 134 defines a threaded end 154. Tubular housing 222 defines a threaded bore 244 into which threaded end 44 of housing 40 and threaded end 154 of solid rod 134 are assembled. Once the appropriate engagement length between threaded end 44 and bore 244, the appropriate engagement length between threaded end 154 and bore 244 and the appropriate length of V-shape torque rod 218 is set, a pair of bolts 226 are inserted through ears 224 and a pair of nuts 228 are threaded onto bolts 226. Nuts 228 are tightened to secure the attachment of clamp 220. A lock washer, a torque prevailing nut, a locking chemical or the like can be utilized to ensure the integrity of the connection between bolts 226 and nuts 228 if desired.

Figure 8:
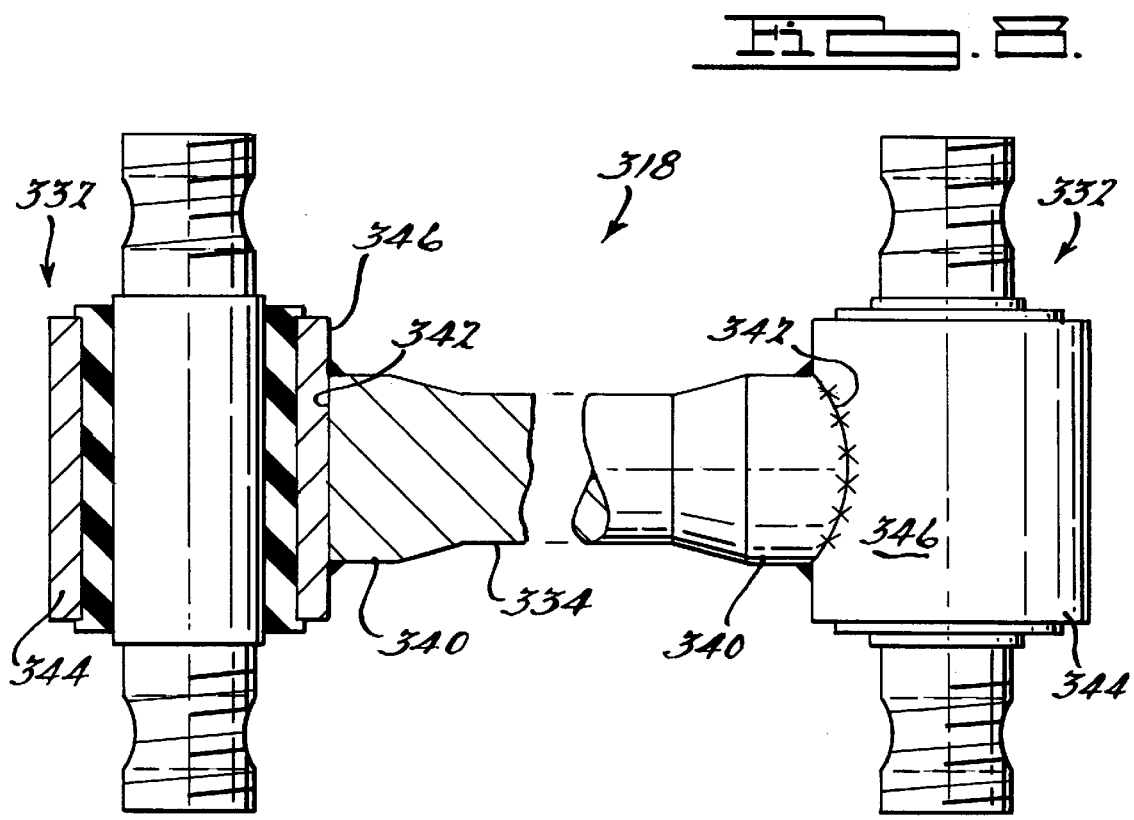
FIG. 8 is a plan view of a straight torque rod including the solid bar connecting rod in accordance with another embodiment of the present invention.
Figure 9:
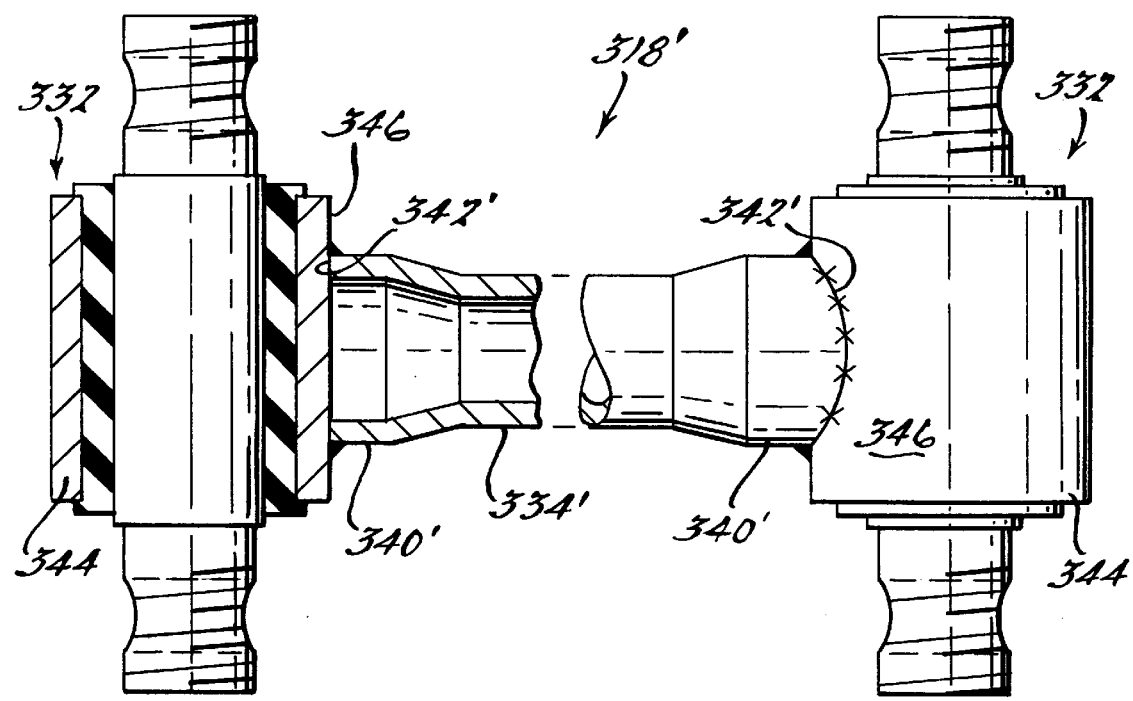
FIG. 9 is a plan view of a straight torque rod which includes a tubular bar connecting rod which incorporates the headed end in accordance with another embodiment of the present invention.

The previous embodiments have illustrated the unique headed enlarged section of the spacer bars for a V-configuration torque rod. The unique headed enlarged section of the spacer bars can also be incorporated into straight torque rods. Straight torque rods are utilized in some application such as for applications where space does not permit the use of a V-shaped torque rod. This situation can occur in applications where torque rods are utilized on the front axle of a vehicle. FIGS. 8–10 illustrate straight torque rods which incorporate the headed spacer bars.

Referring now to FIG. 8, a straight torque rod 318 comprises a pair of end pivotal joint assemblies 332 and a solid rod 334. Solid rod 334 extends between end pivotal joint assemblies 332 and is connected at each end to a respective pivotal joint assembly 332 by welding or by other means known in the art. Solid rod 334 defines an enlarged section 340 defining a generally cylindrical surface 342. Preferably enlarged section 340 is manufactured by heading the end of solid rod 334 as is well known in the art. A generally tubular eyelet 344 defines an outer surface 346 which mates with cylindrical surface 342. Eyelet 344 is secured to enlarged section 340 by MIG welding or by other means know in the art. The heading operation that is performed on solid rod 334 increases the radial dimension of the welding area thus allowing the welding to be performed at a radial dimension that has proven to avoid early fatigue failures of the connection. Once eyelet 344 has been secured to solid rod 334, the assembly end pivot joint assembly 332 into eyelet 344 can be accomplished.

Referring now to FIG. 9, a straight torque rod 318' comprises the pair of end pivotal joint assemblies 332 and a tubular rod 334'. Tubular rod 334' extends between end pivotal joint assemblies 332 and is connected at each end to a respective pivotal joint assembly 332 by welding or by other means known in the art. Tubular rod 334' defines an enlarged section 340' defining a generally cylindrical surface 342'. Preferably enlarged section 340' is manufactured by heading the end of tubular rod 334' as is well known in the art. The generally tubular eyelet 344 defines outer surface 346 which mates with cylindrical surface 342'. Eyelet 344 is secured to enlarged section 340' by MIG welding or by other means known in the art. The heading operation that is performed on tubular rod 334' increases the radial dimension of the welding area thus allowing the welding to be performed at a radial dimension that has proven to avoid early fatigue failures of the connection. Once eyelet 344 has been secured to tubular rod 334', the assembly end pivot joint assembly 332 into eyelet 344 can be accomplished.

Referring now to FIG. 10, a straight torque rod 418 in accordance with another embodiment of the present invention is illustrated. Straight torque rod 418 comprises the pair of pivotal joint assemblies 332, a solid rod 434, a solid rod 436 and the attachment clamp 220. Straight torque rod 418 is essentially the same as straight torque rod 318 with the exception that the single solid rod 334 has been replaced by solid rod 434 and solid rod 436 and the two solid rods are attached to each other using clamp 220. Each of solid rods 434 and 436 include enlarged section 340 which is headed on the end of rods 434 and 436 and then welded to a respective eyelet 344 as defined above for torque rod 318. Enlarged sections 340 provide the same advantages as discussed above.

Clamp 220 comprises a tubular housing 222 having a pair of radially extending ears 224. Solid rod 436 defines threaded end 44. The end of solid rod 434 defines threaded end 154. Tubular housing 222 defines threaded bore 244 into which threaded end 44 of solid rod 436 and threaded end 154 of solid rod 434 are assembled. Once the appropriate engagement length between threaded end 44 and bore 244, the appropriate engagement length between threaded end 154 and bore 244 and the appropriate length of straight torque rod 418 is set, a pair of bolts 226 are inserted through ears 224 and a pair of nuts 228 are threaded onto bolts 226. Nuts 228 are tightened to secure the attachment of clamp 220. A lock washer, a torque prevailing nut, a locking chemical or the like can be utilized to ensure the integrity of the connection between bolts 226 and nuts 228 if desired. While straight torque rod 418 has been shown using solid rods 434 and 436, it is within the scope of the present invention to replace solid rods 434 and 436 with tubular rods if desired.

While the above detailed description describes the preferred embodiment of the present invention, it should be understood that the present invention is susceptible to modification, variation and alteration without deviating from the scope and fair meaning of the subjoined claims.

What is claimed is:

1. A torque rod comprising:
   a first end joint assembly;
   a first solid rod separate from and secured to said first end joint assembly, said first solid rod including a first headed end, said first solid rod defining a first diameter and said first headed end defining a second diameter, said second diameter being generally concentric with and greater than said first diameter, said second diameter engaging said first end joint assembly for securing said first solid rod to said first end joint assembly;
   a second end joint assembly;
   a second solid rod separate from and secured to said second end joint assembly; and
   an apex joint assembly secured directly to said first and second solid rods.

2. The torque rod according to claim 1 wherein, said first end joint assembly includes a first eyelet, said first rod being secured to said first end joint assembly by securing said first eyelet to said second diameter of said first headed end.

3. The torque rod according to claim 2 wherein, said first eyelet defines a first contoured surface and said first headed end defines a second contoured surface, said second contoured surface engaging said first contoured surface.

4. The torque rod according to claim 2 wherein, said second solid rod includes a second headed end, said second solid rod defines a third diameter and said second headed end defines a fourth diameter, said fourth diameter being generally concentric with and greater than said first diameter.

5. The torque rod according to claim 4 wherein, said second end joint assembly includes a second eyelet, said second solid rod being secured to said second end joint assembly by securing said second eyelet to said fourth diameter of second headed end.

6. The torque rod according to claim 5 wherein, said second eyelet defines a third contoured surface and said second headed end defines a fourth contoured surface, said fourth contoured surface engaging said third contoured surface.

7. The torque rod according to claim 1 further comprising, a first clamp secured to said first solid rod and said apex joint assembly for securing said first solid rod to said apex joint assembly.

8. The torque rod according to claim 7 further comprising, a second clamp secured to said second solid rod and said apex joint assembly for securing said second solid rod to said apex joint assembly.

9. The torque rod according to claim 7 wherein, said first end joint assembly includes a first eyelet, said first solid rod being secured to said first end joint assembly by securing said first eyelet to said second diameter of said first headed end.

10. The torque rod according to claim 9 wherein, said first eyelet defines a first contoured surface and said first headed end defines a second contoured surface, said second contoured surface engaging said first contoured surface.

11. The torque rod according to claim 9 wherein, said second solid rod includes a second headed end, said second solid rod defines a third diameter and said second headed end defines a fourth diameter, said fourth diameter being generally concentric with and greater than said first diameter.

12. The torque rod according to claim 9 wherein, said second end joint assembly includes a second eyelet and said second solid rod includes a second headed end, said second solid rod being secured to said second end joint assembly by securing said second eyelet to said second headed end.

13. A torque rod comprising:

a first joint assembly;

a rod member separate from said first joint assembly and having a first end secured to said first joint assembly, said rod member defining a first diameter and said first end defining a second diameter, said second diameter being generally concentric with and greater than said first diameter, said second diameter engaging said first joint assembly for securing said first end of said rod member to said first joint assembly; and a second joint assembly secured directly to a second end of said rod member.

14. The torque rod according to claim 13 wherein, said rod member is a solid rod.

15. The torque rod according to claim 14 wherein, said second end defines a third diameter, said third diameter being generally concentric with and greater than said first diameter.

16. The torque rod according to claim 13 wherein, said rod member is a tubular rod.

17. The torque rod according to claim 16 wherein, said second end defines a third diameter, said third diameter being generally concentric with and greater than said first diameter.

18. The torque rod according to claim 16 wherein, said second end defines a third diameter, said third diameter being generally concentric with and greater than said first diameter.

19. The torque rod according to claim 13 wherein, said rod member comprises a first rod, a second rod and a clamp securing said first rod to said second rod.

20. A torque rod comprising:

a first end joint assembly;

a first tubular rod separate from and secured to said first end joint assembly, said first tubular rod including a first headed end, said first tubular rod defining a first diameter and said first headed end defining a second diameter, said second diameter being generally concentric with and greater than said first diameter, said second diameter engaging said first end joint assembly for securing said first tubular rod to said first end joint assembly;

a second end joint assembly;

a second tubular rod separate from and secured to said second end joint assembly; and an apex joint assembly secured directly to said first and second tubular rods.

21. The torque rod according to claim 20 wherein, said second tubular rod includes a second headed end, said second headed end defining a third diameter, said third diameter being generally concentric with and greater than said first diameter.

* * * * *

UNITED STATES PATENT AND TRADEMARK OFFICE
CERTIFICATE OF CORRECTION

PATENT NO. : 6,267,526 B1
DATED : July 31, 2001
INVENTOR(S) : Ronald J. McLaughlin It is certified that error appears in the above-identified patent and that said Letters Patent is hereby corrected as shown below:

Column 3,
Line 6, delete 2nd occurrence of "to"
Line 13, delete "damper" and substitute -- dampen -- therefor
Lines 26-27, delete "constructing" and substitute -- construction -- therefor
Line 59, delete "Sold" and substitute -- Solid -- therefor Column 4,
Line 19, delete "secure" and substitute -- secured -- therefor Column 6,
Line 21, after "first" insert -- solid --
Line 32, "first" should be -- third --

Column 7,
Line 26, "claim 16" should be -- claim 13 --

Signed and Sealed this

First Day of April, 2003

JAMES E. ROGAN
*Director of the United States Patent and Trademark Office*